US011732092B2

(12) United States Patent
Knott et al.

(10) Patent No.: US 11,732,092 B2
(45) Date of Patent: *Aug. 22, 2023

(54) UPCYCLING PROCESS FOR PROCESSING SILICONE WASTES

(71) Applicant: Evonik Operations GmbH, Essen (DE)

(72) Inventors: Wilfried Knott, Essen (DE); Horst Dudzik, Essen (DE); Dietmar Schaefer, Hattingen (DE)

(73) Assignee: Evonik Operations GmbH, Essen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/476,417

(22) Filed: Sep. 15, 2021

(65) Prior Publication Data

US 2022/0119617 A1 Apr. 21, 2022

(30) Foreign Application Priority Data

Oct. 19, 2020 (EP) .................................. 20202477
May 18, 2021 (EP) .................................. 2117443

(51) Int. Cl.
*C08G 77/46* (2006.01)
*C08J 11/26* (2006.01)
*C08J 11/12* (2006.01)
*C08G 77/14* (2006.01)

(52) U.S. Cl.
CPC ............. *C08G 77/46* (2013.01); *C08G 77/14* (2013.01); *C08J 11/12* (2013.01); *C08J 11/26* (2013.01); *C08J 2383/04* (2013.01); *C08J 2383/06* (2013.01)

(58) Field of Classification Search
None
See application file for complete search history.

(56) References Cited

U.S. PATENT DOCUMENTS

| | | | |
|---|---|---|---|
| 5,110,972 A | 5/1992 | Greenlee | |
| 5,208,311 A | 5/1993 | Schaefer et al. | |
| 5,371,161 A | 12/1994 | Knott | |
| 5,391,679 A | 2/1995 | Burkhart et al. | |
| 5,475,127 A | 12/1995 | Klein et al. | |
| 5,856,548 A | 1/1999 | Droese et al. | |
| 6,172,253 B1* | 1/2001 | Kawamoto | C07F 7/089 556/466 |
| 6,255,511 B1 | 7/2001 | Klein et al. | |
| 6,288,129 B1 | 9/2001 | Gruning et al. | |
| 6,291,622 B1 | 9/2001 | Droese et al. | |
| 6,307,082 B1 | 10/2001 | Klein et al. | |
| 6,489,498 B2 | 12/2002 | Klein et al. | |
| 6,652,665 B1 | 11/2003 | Sachdev et al. | |
| 6,858,663 B2 | 2/2005 | Knott et al. | |
| 7,125,585 B2 | 10/2006 | Dudzik et al. | |
| 7,157,541 B2 | 1/2007 | Knott et al. | |
| 7,196,153 B2 | 3/2007 | Burkhart et al. | |
| 7,598,334 B2 | 10/2009 | Ferenz et al. | |
| 7,612,158 B2 | 11/2009 | Burkhart et al. | |
| 7,612,159 B2 | 11/2009 | Burkhart et al. | |
| 7,619,035 B2 | 11/2009 | Henning et al. | |
| 7,645,848 B2 | 1/2010 | Knott et al. | |
| 7,754,778 B2 | 7/2010 | Knott et al. | |
| 7,825,205 B2 | 11/2010 | Knott et al. | |
| 7,825,206 B2 | 11/2010 | Neumann et al. | |
| 7,825,209 B2 | 11/2010 | Knott et al. | |
| 8,138,294 B2 | 3/2012 | Henning et al. | |
| 8,247,525 B2 | 8/2012 | Schubert et al. | |
| 8,268,939 B2 | 9/2012 | Ebbrecht et al. | |
| 8,283,422 B2 | 10/2012 | Schubert et al. | |
| 8,309,664 B2 | 11/2012 | Knott et al. | |
| 8,309,673 B2 | 11/2012 | Schubert et al. | |
| 8,324,325 B2 | 12/2012 | Knott et al. | |
| 8,334,355 B2 | 12/2012 | Henning et al. | |
| 8,349,907 B2 | 1/2013 | Henning et al. | |
| 8,420,748 B2 | 4/2013 | Henning et al. | |
| 8,450,514 B2 | 5/2013 | Schubert et al. | |
| 8,557,944 B2 | 10/2013 | Henning et al. | |
| 8,598,295 B2 | 12/2013 | Henning et al. | |
| 8,609,798 B2 | 12/2013 | Knott et al. | |
| 8,623,984 B2 | 1/2014 | Henning et al. | |
| 8,722,834 B2 | 5/2014 | Knott et al. | |
| 8,729,207 B2 | 5/2014 | Hartung et al. | |
| 8,772,423 B2 | 7/2014 | De Gans et al. | |
| 8,779,079 B2 | 7/2014 | Henning et al. | |
| 8,802,744 B2 | 8/2014 | Knott et al. | |
| 8,841,400 B2 | 9/2014 | Henning et al. | |
| 8,921,437 B2 | 12/2014 | Knott et al. | |
| 8,946,369 B2 | 2/2015 | Henning et al. | |
| 8,969,502 B2 | 3/2015 | Knott et al. | |
| 8,974,627 B2 | 3/2015 | Schubert et al. | |
| 8,993,706 B2 | 3/2015 | Schubert et al. | |
| 9,035,011 B2 | 5/2015 | Ferenz et al. | |
| 9,068,044 B2 | 6/2015 | Schubert et al. | |
| 9,315,614 B2 | 4/2016 | Schubert et al. | |
| 9,334,354 B2 | 5/2016 | Ferenz et al. | |
| 9,353,225 B2 | 5/2016 | Knott et al. | |
| 9,441,145 B2 | 9/2016 | Schubert et al. | |
| 9,540,278 B2 | 1/2017 | Chapman et al. | |
| 9,695,202 B2 | 7/2017 | Henning et al. | |
| 9,896,541 B2 | 2/2018 | Fiedel et al. | |
| 9,975,909 B2 | 5/2018 | Schubert et al. | |
| 10,087,278 B2 | 10/2018 | Lobert et al. | |
| 10,106,649 B2 | 10/2018 | Fiedel et al. | |
| 10,399,998 B2 | 9/2019 | Knott et al. | |
| 10,414,871 B2 | 9/2019 | Knott et al. | |
| 10,414,872 B2 | 9/2019 | Knott et al. | |
| 10,519,280 B2 | 12/2019 | Knott et al. | |

(Continued)

FOREIGN PATENT DOCUMENTS

DE 103 37 309 A1 3/2005
DE 10 2014 211 680 A1 2/2015

(Continued)

OTHER PUBLICATIONS

Machine translation of JP 09-176364 (Jul. 8, 1997).*

(Continued)

*Primary Examiner* — Marc S Zimmer
(74) *Attorney, Agent, or Firm* — Grüneberg and Myers PLLC

(57) ABSTRACT

Upcycling process for producing acidic, end-equilibrated siloxanes bearing acetoxy groups and having chain lengths of greater than 3 silicon atoms from end-of-life silicones by thermal digestion in an acidic reaction medium comprising acetic anhydride, acetic acid and at least one further Brønsted acid having a pKa of <4, the digestion taking place in a reactor having a volume of at least 1 liter.

18 Claims, No Drawings

(56) References Cited

U.S. PATENT DOCUMENTS

| | | | |
|---|---|---|---|
| 10,526,454 B2 | 1/2020 | Knott et al. | |
| 10,544,267 B2 | 1/2020 | Knott et al. | |
| 10,752,735 B2 | 8/2020 | Knott et al. | |
| 10,766,913 B2 | 9/2020 | Knott et al. | |
| 10,787,464 B2 | 9/2020 | Fiedel et al. | |
| 10,836,867 B2 | 11/2020 | Knott | |
| 10,954,344 B2 | 3/2021 | Knott et al. | |
| 11,021,575 B2 | 6/2021 | Knott et al. | |
| 11,066,429 B2 | 7/2021 | Knott et al. | |
| 11,220,578 B2 | 1/2022 | Knott et al. | |
| 11,261,298 B2 | 3/2022 | Favresse et al. | |
| 11,286,366 B2 * | 3/2022 | Knott | C08J 11/26 |
| 2002/0161158 A1 | 10/2002 | Burkhart et al. | |
| 2007/0128143 A1 | 6/2007 | Gruning et al. | |
| 2009/0137752 A1 | 5/2009 | Knott et al. | |
| 2010/0012623 A1 | 1/2010 | Mignani | |
| 2010/0022435 A1 | 1/2010 | Henning et al. | |
| 2010/0081781 A1 | 4/2010 | Schubert et al. | |
| 2011/0230619 A1 | 9/2011 | Kuppert et al. | |
| 2011/0301254 A1 | 12/2011 | Knott et al. | |
| 2012/0068110 A1 | 3/2012 | Schubert et al. | |
| 2012/0282210 A1 | 11/2012 | Henning et al. | |
| 2013/0041115 A1 | 2/2013 | Knott et al. | |
| 2013/0213267 A1 | 8/2013 | Fiedel et al. | |
| 2013/0345318 A1 | 12/2013 | Schubert et al. | |
| 2014/0256844 A1 | 9/2014 | Henning et al. | |
| 2015/0004112 A1 | 1/2015 | Ritter et al. | |
| 2015/0004113 A1 | 1/2015 | Ritter et al. | |
| 2016/0130402 A1 | 5/2016 | Schubert et al. | |
| 2019/0106369 A1 | 4/2019 | Schubert et al. | |
| 2020/0055991 A1 * | 2/2020 | Knott | C08G 77/392 |
| 2020/0339612 A1 | 10/2020 | Knott et al. | |
| 2020/0377524 A1 | 12/2020 | Knott et al. | |
| 2020/0377525 A1 | 12/2020 | Knott et al. | |
| 2020/0377640 A1 | 12/2020 | Knott et al. | |
| 2020/0377665 A1 | 12/2020 | Knott et al. | |
| 2020/0377666 A1 | 12/2020 | Knott et al. | |
| 2020/0377669 A1 | 12/2020 | Knott et al. | |
| 2020/0377684 A1 | 12/2020 | Hermann et al. | |
| 2020/0377686 A1 | 12/2020 | Knott et al. | |
| 2020/0385528 A1 | 12/2020 | Knott | |
| 2021/0130551 A1 | 5/2021 | Knott et al. | |
| 2021/0163687 A1 | 6/2021 | Knott et al. | |
| 2021/0171719 A1 | 6/2021 | Knott et al. | |
| 2021/0253780 A1 | 8/2021 | Wessely et al. | |
| 2021/0253799 A1 | 8/2021 | Knott et al. | |
| 2021/0301099 A1 | 9/2021 | Knott et al. | |
| 2021/0371598 A1 | 12/2021 | Knott et al. | |
| 2022/0033587 A1 | 2/2022 | Knott et al. | |

FOREIGN PATENT DOCUMENTS

| | | |
|---|---|---|
| DE | 10 2009 019 002 U1 | 5/2015 |
| EP | 0 514 737 A1 | 11/1992 |
| EP | 0 950 684 A2 | 10/1999 |
| EP | 3 744 753 A1 | 12/2020 |
| EP | 3 744 774 A1 | 12/2020 |
| JP | H04 318075 A | 11/1992 |
| WO | 2008/097306 A1 | 8/2008 |
| WO | 2021/058263 A1 | 4/2021 |

OTHER PUBLICATIONS

Machine translation of CN 106750311 (May 2017).*
Partners for Innovation, "Kit tubes in a circular economy—Final report Chain project for solutions of the sealant tube-problem in the plastic cycle," copyright May 2017 (31 pages).
Enthaler, "Iron-Catalyzed Depolymerization of Polysiloxanes to Produce Sichlorodimethylsilane, Diacetoxydimethylsilane, or Dimethoxydimethylsilane," Journal of Applied Polymer Science, Bd. 132, Nr. 3, copyright Jan. 2015 (8 pages).
German language European Search Report dated Jan. 4, 2021 in EP 20202477.4 (6 pages).
Guo et al., "Calculation of hydrophile-lipophile balance for polyethoxylated surfactants by group contribution method," copyright 2006, J. Colloid Interface Science 298, pp. 441-450 (10 pages).
Vollmer et al., "Beyond Mechanical Recycling: Giving New Life to Plastic Waste," copyright 2020, Angew. Chem. Int. Ed., 59, pp. 15402-15423 (22 pages).
Pola et al., "Mechanism of Reversible Cleavage of Acetoxysilanes to Siloxanes and Acetanhydride," copyright 1974, Collect. Czech. Chem. Commun., 39(5), pp. 1169-1176 (8 pages).
Simmler, Houben-Weyl, Methods of Organic Chemistry, vol. VI/2, 4th Edition, O-Metal Derivates of Organic Hydroxy Compounds p. 162 ff. (101 pages).
Knott et al., U.S. Appl. No. 17/239,011, filed Apr. 23, 2021.

* cited by examiner

UPCYCLING PROCESS FOR PROCESSING SILICONE WASTES

CROSS REFERENCE TO RELATED APPLICATIONS

This application is a 35 U.S.C. § 119 patent application which claims the benefit of European Application No. 21174438.8 filed May 18, 2021 and European Application No. 20202477.4 filed Oct. 19, 2020, both of which are incorporated herein by reference in its entirety.

FIELD

The invention is in the field of silicones; more particularly, it relates to a process for the upcycling of silicone wastes, preferably of silicone adhesives and/or silicone sealants and also of silicone rubber/silicone oil wastes.

BACKGROUND

Because of their specific material characteristics, silicone components meet particular demands from a medical, pharmaceutical and food technology viewpoint. They are physiologically entirely inert given appropriate processing. For instance, products made of silicone are encountered in food applications, in medicine and in pharmaceutical sectors. Babies' dummies and pacifiers are produced from silicone, as are divers' goggles. In technical industrial applications, silicone appears in many cases as a material for gaskets or in dynamic applications for membranes. In the automotive sector, it is used for hoses, sheaths or as cable insulation.

Silicone has in its mechanical properties a crucial advantage over other rubber types. In the case of silicone, they are conserved at a relatively stable level over a very wide temperature range, whereas the mechanical properties of many other materials deteriorate significantly under cold or hot conditions. While a look at the technical data sheet for an EPDM material, for example, might suggest it is superior to a silicone mixture in its mechanical properties because it is the properties at room temperature that are stated here, the exact opposite picture is found at high or low temperatures. Thermal stability in air for silicone is from about −80° C. to about 250° C. This property is extensively used for gaskets since the very low compression set that is typical of silicone is manifested here.

On account of their excellent stability to ozone, UV and weathering, silicone mixtures are also commonly used in outdoor applications. In addition, silicone has very low flammability and has both good electrical insulation capacity and good electrical conductivity. Silicone is chemically stable e.g. towards vegetable and animal fats, hot water and alcohol. Stability to acids, alkalis, fuels and ketones, and also to steam is limited. Silicone additionally has very high gas permeability.

As well as industrial applications, silicone has been used for decades as a preferred elastomer in the medical sector. Silicone components are here also used as short-term implants (for shorter than 30 days in Class IIa medical devices) or long-term implants (for 30 days or longer in Class IIb medical devices), where they fulfil critical functions in devices such as heart catheters, heart pacemakers, ventilation devices, neurostimulators and defibrillators.

Silicone rubber that is to be used for long-term implants is supplied by only very few producers worldwide (for example by NuSil Technology). Production of the mixtures takes place under strict conditions imposed by the US Food and Drug Administration (FDA). Exceptional purity must likewise be ensured during processing and component production must take place in a cleanroom.

An important advantage of silicone here is that it is biocompatible and hence is well tolerated by humans. The biocompatibility of a silicone mixture is commonly demonstrated by USP Class VI classifications (USP stands for United States Pharmacopeia) or by tests according to the stricter (DIN EN) ISO 10993 standard. (DIN EN) ISO 10993 serves primarily for the testing of medical devices that are implanted in the human body for a long period or permanently. For shorter-term applications, classification according to USP Class VI or possibly a lower classification is sufficient.

In addition, silicone, on account of its property of being usable within a wide temperature range from about −80° C. to about 250° C., offers the option of steam sterilization (heating in an autoclave). Silicone products can thus be freed of live microorganisms, their dormant forms, viruses, etc. The good electrical insulation capabilities of silicone are also of particular significance in the medical sector.

Variation of the silicone rubbers used and of the modes of crosslinking allows silicones to take on particular properties. For instance, HTV silicone rubbers are flexible and stable within a wide temperature range from −50° C. up to 200° C., in some cases up to 300° C. They are found in gaskets in the automotive or food industry, in cable sheaths or as insulation material.

RTV silicone rubbers are valued particularly for their thermal conductivity and electrical insulation capability and are for that reason employed with preference in the electrical and electronics sector.

Liquid silicones (also LSRs, liquid silicone rubbers) have lower viscosity compared with HTV and RTV silicone rubbers. They can be rendered into a wide variety of different shapes by injection moulding and processed for example into silicone hoses. Since LSR silicones are always produced by platinum crosslinking, products based on liquid silicones can be used in medical technology sectors.

By virtue of its high stability within the human body, silicone thus constitutes very good protection of critical components and is additionally used with preference for functional parts on account of the properties mentioned.

The fundamental difference between silicone rubber and other organic elastomers is that its main chains, which have an inorganic structure, do not consist of carbon-carbon bonds but are formed from combinations of silicon and oxygen atoms, with fumed silica in particular used as filler for the development of good properties.

Depending on their physical state and vulcanization temperature, silicone rubbers can be divided into three groups:

Silicone rubbers referred to as HTV (high temperature vulcanizing) or HCR (high consistency rubber) are those having a solid raw material. They are vulcanized at high temperatures typically between 140° C. and 200° C. Crosslinking is effected by peroxides or by an addition reaction using platinum compounds as catalyst.

Liquid silicone or LSR (liquid silicone rubber) as raw material is a (viscous) liquid and consists of two components that are mixed directly prior to processing. Crosslinking is effected by addition reaction at temperatures similar to those for the HTV types, generally with significantly faster crosslinking.

Both silicone types can be colored. Finished elastomer articles made from HTV silicone and LSR silicone barely differ in their properties.

The third group are what are called RTV (room temperature vulcanizing) silicones. In this type, crosslinking already occurs at room temperature. They are extensively used as adhesive and/or sealant compounds or in prototype production. They are available both as one-component and as two-component systems.

Just as the use properties derivable from the exceptional chemical stability of silicones are advantageous for the service life of the articles manufactured therefrom, so the stability thereof is a problem when disposing of silicones at the end of their life cycle (end-of-life silicones/silicone wastes).

The experiments and work on the recycling of silicone wastes described in the known prior art to date have yielded only poor results, as is explained in detail in the as yet unpublished European patent application under file reference 19176869.6. In the absence of an industrially feasible and attractive route for physically recycling both silicone oils and solid silicones, the as yet unpublished European patent application under file reference 19176869.6 had proposed a process for recycling silicones through the chemical transformation thereof into siloxanes and/or silanes having acetoxy groups, wherein the silicones to be recycled undergo heat-treatment in digestion systems comprising acetic anhydride and/or an acetoxysiloxane and at least one Brønsted acid, preferably with addition of acetic acid.

SUMMARY

Against this background, the object of the present invention was to provide an upcycling process for the utilization of silicone wastes/end-of-life silicones as a resource for providing high-value Si products, focusing in particular on the production of surface-active substances.

In the context of the present invention and against the background described in the as yet unpublished European patent application under file reference 19176869.6, the inventors are now proposing a corresponding upcycling process for the utilization of silicone wastes/end-of-life silicones. This enables the utilization of silicone wastes/end-of-life silicones as a resource for providing novel high-value Si products, focusing in particular on the production of surface-active substances. Selective transformation of silicone wastes/end-of-life silicones generates particularly high-value end-equilibrated siloxanes bearing acetoxy groups and having chain lengths of greater than 3 silicon atoms that may be used directly as a starting material for the synthesis of novel high-value silicone products, in particular with a view to producing surface-active substances.

DETAILED DESCRIPTION

Against this background, the present invention provides an upcycling process for producing acidic, end-equilibrated siloxanes bearing acetoxy groups and having chain lengths of greater than 3 silicon atoms from end-of-life silicones, in particular comprising silicone adhesives and/or silicone sealant wastes and/or silicone rubber wastes and/or silicone oil wastes, by thermal digestion of the end-of-life silicones in an acidic reaction medium comprising acetic anhydride, acetic acid and at least one further Brønsted acid having a pKa of <4, the digestion taking place in a reactor having a volume of at least 1 liter.

In particular, the digestion takes place in a reactor having a volume of at least 5 liters, in particular at least 12 liters and preferably not more than 500 000 liters.

It is further preferable that the digestion is carried out without removal of water.

In the context of the present invention, the inventor has established that acetic anhydride is the system component responsible for the acetoxy functionalization of the siloxane undergoing processing.

When e.g. decamethylcyclopentasiloxane as a model system is reacted with acetic acid alone (2 mol acetic acid based on 15 mol of D units) and 0.2 percent by mass of trifluoromethanesulfonic acid at 120° C. in a 6-hour run with a reflux condenser fitted, this results in the subsequent isolation of a highly viscous liquid that in the $^{29}$Si NMR spectrum, besides D unit signals at positions typical of linear polydimethylsiloxanes and the clear presence of octamethylcyclotetrasiloxane ($D_4$, $\delta$=–19.1 ppm), also additionally indicates a trace of ≡SiOH, but no evidence at all of an acetoxy-modified polydimethylsiloxane.

This finding obtained with the model system can likewise be confirmed in the experiment to produce an α,ω-diacetoxypolydimethylsiloxane from an end-of-life silicone.

When, in a 6-hour run at a reaction temperature of 120° C., just pure acetic acid combined with 0.2 percent by weight of trifluoromethanesulfonic acid is used for the digestion of hardened sealant material (silicone from cartridge) without removal of water (reflux condenser fitted), there is no linking at all of acetoxy groups to the siloxane, as highlighted by the absence of the $^{29}$Si NMR signal at a chemical shift of approx. –9.2 ppm characteristic of polydimethylsiloxane chains bearing acetoxy groups.

When, on the other hand, the hardened sealant material concerned undergoes a 6-hour digestion according to the invention with reflux condenser fitted at a reaction temperature of 120° C., adding the appropriate amount of acetic anhydride and with addition of 0.2 percent by weight of trifluoromethanesulfonic acid and 3 percent by weight of acetic acid, the freely mobile liquid obtained showed the $^{29}$Si NMR signal at a chemical shift of approx. –9.2 ppm characteristic of polydimethylsiloxane chains bearing acetoxy groups. The ratio of the signal intensities confirmed moreover that the target chain length of N=14 had been achieved.

The acetoxy-modified siloxane obtained with the upcycling claimed in accordance with the invention is end-equilibrated, which can be readily demonstrated particularly in recycling runs in which an appropriate amount of liquid decamethylcyclopentasiloxane has been additionally added to the solid silicone rubber to be digested for greater ease of mixing/stirring.

$^{29}$Si NMR samples taken during the reaction demonstrate that the $D_5$ signal occurring at a chemical shift of –21.5 ppm declines in the course of the reaction, whereas the $D_4$ signal at approx. –19.1 ppm that is initially absent appears and increases in intensity.

What is for the purposes of the invention meant by the term "end-equilibrated" is that the equilibrium established at a temperature of 23° C. and a pressure of 1013.25 hPa has been reached. The point at which said equilibrium has been reached is indicated by the total cycles content determined by gas chromatography, defined as the sum of the $D_4$, $D_5$ and $D_6$ contents based on the siloxane matrix and determined after derivatization to the corresponding α,ω-diisopropoxypolydimethylsiloxanes of the α,ω-diacetoxypolydimethylsiloxanes obtained from the digestion according to the invention. Derivatization to the α,ω-diisopropoxypolydimethylsiloxanes is chosen here with the express intention of preventing a thermally induced retro-cleavage reaction of the α,ω-diacetoxypolydimethylsiloxanes that could take place under the conditions of the gas chromatography analysis (for information on the retrocleavage reaction, see inter alia J. Pola et al., Collect. Czech. Chem. Commun. 1974, 39(5), 1169-1176 and also W. Simmler, Houben-Weyl, Methods of Organic Chemistry, vol. VI/2, 4th edition, O-Metal Derivatives of Organic Hydroxy Compounds p. 162 ff)).

In accordance with the invention, the total cycles content present therein, defined as the sum of the content fractions of the cyclic siloxanes comprising $D_4$, $D_5$ and $D_6$ based on the siloxane matrix, should preferably account for less than 13 percent by weight, more preferably less than 12 percent by weight, of the siloxane matrix consisting of $\alpha,\omega$-diisopropoxypolydimethylsiloxanes.

The use according to the invention of acetic acid makes it unproblematic here for the proportion at equilibrium to be below the 13 percent by weight of the total cycles content that is otherwise usual in the linear $\alpha,\omega$-diisopropoxypolydimethylsiloxanes.

In a preferred embodiment, the reaction is initially carried out within a temperature range from 40 to 120° C. and thereafter, in order to ensure end equilibration, within a temperature range from 140 to 160° C., with a reaction time of preferably 4 to 10 hours.

The reaching of equilibrium in the acidic, end-equilibrated siloxanes bearing acetoxy groups and having chain lengths of greater than 3 silicon atoms produced according to the invention enables the successful further processing thereof as a reactive siloxane in copolymers having surfactant activity.

The reaction of acetoxy-group-bearing siloxanes of the invention with polyethers thus provides access to SiOC-linked polyether siloxanes employed as surface-active substances in important technical applications.

The surfactant activity of these copolymer compounds can be described qualitatively by the value for what is known as the HLB (hydrophilic-lipophilic-balance), which assigns a numerical value to the chemical structure of the substance having surfactant activity by means of a group contribution system and is an expression of the contribution of the siloxane component and of the polyether component. Thus, the numerically describable activity of a polyether (sub)structure is determined not only by the nature and number of the monomers (such as ethylene oxide and propylene oxide) incorporated therein, but also by the nature of the end group (such as hydroxyl vs. alkoxy group). The calculation of HLB values specifically for polyethers derived from polyoxyethylene-polyoxypropylene structures can for example be deduced according to the group contribution method described by Davies and refined by X. Guo et al. (J. Colloid Interface Science 298, 441-450 (2006).

For the contribution of the siloxane component to the surfactant activity, it is on the other hand the chain length, that is to say the number of silicon atoms present in the siloxane backbone, more particularly the number of repeat units and here specifically the number of D units (dimethylsiloxy functions), that is key.

In accordance with the invention, dimethylsilane (sub) structures, that is to say ones having just one Si atom, as well as the lowest representatives of the polydimethylsiloxane series having only 2 or 3 repeat dimethylsiloxy structures, contribute virtually nothing to the surfactant activity of polyether derivatives derived therefrom, for example in defoamers and/or deaerating agents; instead, it is often in fact the case that these strongly diffusing, low-molecular-weight copolymers can give rise in coating systems undergoing curing to undesired malfunctions such as residual tackiness (due to migration to the surface).

In this context, besides consideration of the specific chemical composition of the copolymer, those skilled in the art are aware that polyether siloxanes used as surfactants develop optimal activity only if the basic siloxane structure has a polymer composition corresponding to an equilibrate.

As can be seen clearly from the above, the idea of upcycling silicone wastes is thus directed with a specific focus at the production of surface-active substances, the teaching of the invention being in accordance with the upcycling process set out in the main claim affording end-equilibrated siloxanes bearing acetoxy groups and having chain lengths of greater than 3 silicon atoms.

In the context of the invention, it is in principle possible to successfully use as upcycling feedstocks all silicones, in particular silicone rubber and/or silicone oils. More particularly, this is true of the entirety of the silicones listed in the introductory part of the description. Reference is hereby explicitly made thereto.

In a preferred embodiment of the invention, the process of the invention relates to a process for the upcycling of silicone wastes, in particular of silicone adhesives and/or silicone sealants, silicone rubber wastes and/or silicone oil wastes, preferably with the exclusion of hexamethyldisiloxane. In a preferred embodiment of the invention, the silicone oils to be utilized, in particular silicone oils, are composed of D and M units. In a further preferred embodiment of the invention, the silicones to be utilized have molar masses of >236 g/mol.

In a particularly preferred embodiment of the invention, the upcycling process has the characteristic feature that the end-of-life silicones comprise silicone adhesives and/or silicone sealants, preferably cartridges of silicone adhesive and/or silicone sealant, in particular remnants of silicone adhesive and/or silicone sealant in and/or on PE containers, preferably comprising HDPE and/or LDPE. Customary cartridges of silicone adhesive and/or silicone sealant comprise a silicone adhesive compound and/or silicone sealant compound in a polyethylene container (PE container) that enables the silicone adhesive compound and/or silicone sealant compound to be expelled by applying pressure, the container casing usually being made of HDPE (high-density polyethylene) and the semi-transparent container components (plunger and applicator tip) usually being made of LDPE (low-density polyethylene). HDPE and LDPE are known to those skilled in the art. HDPE has a high density of between 0.94 g/cm$^3$ and 0.97 g/cm$^3$; LDPE has a density lower than this, of between 0.915 g/cm$^3$ and 0.935 g/cm$^3$.

As a further significant advantage, the process of the invention thus additionally enables the single-product recycling of polyethylene, in particular high-density polyethylene (HDPE) originating from preferably used cartridges of silicone adhesive and/or silicone sealant. More generally, it enables silicone-contaminated PE wastes to be recycled to provide acidic, end-equilibrated siloxanes bearing acetoxy groups and having chain lengths of greater than 3 silicon atoms with the essentially single-product recovery of polyethylene.

The significance and scale of the specific problem of silicone contamination in HDPE waste is made clear inter alia by a study by the Dutch Ketenakkoord Kunststofkringloop [Plastic Cycle Value Chain Agreement] and the Afvalfonds Verpakkingen [Packaging Waste Fund] "Kitkokers in een circulaire economie" [Dispensing cartridges in a circular economy], authors I. Gort and S. Haffmans dated 1 May 2017 (available from Kennisinstituut Duurzaam Verpakken, Zuid Hollandlaan 7, 2596 AL Den Haag, the Netherlands, or from their website at https://kidv.nl/ and specifically https://kidv.nl/media/rapportages/kitkokers_in_een_circulaire_economy.pdf?1.1.2-rc.1), which illustrates the dramatic effects minor silicone contamination can have on the reusability of recycled pellet material obtained from waste. For instance, silicone components themselves migrate through the fine, 150 µm melt grids of a pelletizing extruder, thereby ending up in the recycled pellet material and ultimately causing production defects at the plastics processing plant producing e.g. plastic tubing by blow extrusion. It is said that even a single particle of silicone is sufficient to cause surface defects and cavities in the polymer, potentially rendering unusable a whole batch that took hours to produce. The contaminated HDPE is a low-value material and can accordingly be used further only for noncritical purposes.

Such silicone-contaminated material from recycled cartridges is currently acceptable only for processing into crude items such as insulating walls, scaffolding planks, boundary posts, railway sleepers and picnic tables, in which the presence of silicone particles is less noticeable, since a smooth surface is not necessarily expected. However, there is no optimistic content in the described study as regards the material recycling of the silicone component.

The silicone remnants, in particular remnants from used and thus partially emptied silicone sealant cartridges adhere firmly and—depending on the stage of the hardening process—usually stubbornly to the surrounding cartridge wall, and also to the applicator plunger and applicator tip of the cartridge, and cannot be detached easily, and certainly not entirely, from the HDPE that is predominantly used. The study states that all parts of a sealant cartridge are essentially made of polyethylene, the jacket being produced from HDPE and the semi-transparent parts (plunger and applicator tip) often from LDPE (low-density polyethylene).

In accordance with the invention, it has now surprisingly been found that the hardened silicone remnants remaining in the cartridge can be completely detached from HDPE and LDPE by subjecting the sealant cartridge, which is preferably comminuted, e.g. cut into small pieces, to thermal digestion in an acidic reaction medium comprising acetic anhydride, acetic acid and at least one further Brønsted acid having a pKa of <4.

This detaches the silicone remnants from the support material completely, which, through filtration and optional further wash step(s) and drying, can be recovered as practically single-product, silicone-free HDPE/LDPE.

The silicone hereby detached is according to the invention transformed into an acidic, end-equilibrated siloxane bearing acetoxy groups and having a chain length of greater than 3 silicon atoms.

The route discovered according to the invention thus additionally opens up the technical possibility of recovering not only single-product HDPE, but also—in the sense of upcycling from low-value, problematic silicone wastes—high-value reactive siloxanes that can be processed into valuable surface-active additives.

End-of-life silicone sealant cartridges with adhering silicone can advantageously first be cold-embrittled through contact with for example liquid nitrogen or even dry ice pellets, thereby undergoing a significant reduction in elasticity, and can then be appropriately comminuted. Cold-embrittled silicone sealant cartridges can be comminuted for example with the aid of a crusher, a shredder, a mill, a hammer mill, with the aid of rollers or a kneading device or with the aid of cutting machines. At the end of comminution, the small pieces of cartridge material with adhering silicone preferably have edge lengths of 1 to 10 mm, in particular of 3 to 6 mm. According to the invention, the comminuted material preferably undergoes immediate thermal digestion in an acidic reaction medium comprising acetic anhydride, acetic acid and at least one further Brønsted acid having a pKa of <4.

Less preferably, it is however also possible, for example based on the teaching of WO 2008/097306 A1, for the small pieces of cartridge material with adhering silicone to be first subjected to a preliminary separation, by introducing said material into a liquid having a density between that of the silicone and of the cartridge plastic, thereby resulting in a density separation of the cartridge material and silicone components (corresponding to the formation of density-separated layers).

The limitations of this type of preliminary separation are demonstrated inter alia in the study by the Ketenakkoord Kunststofkringloop and the Afvalfonds Verpakkingen (see above, pages 22 and 34). For instance, the separation efficiency in the density separation is reduced for example by occluded air inclusions in the silicone that cause buoyancy, thereby resulting in varying proportions of silicone also again ending up in the plastic layer.

According to the invention, the thermal digestion is carried out in an acidic reaction medium in a reactor having a volume of at least one liter. Taking account of the aggressive nature of the reaction medium of the invention, the reactor material is preferably selected from glass or ceramic, preferably from metal, more preferably highly alloyed stainless steels and particular preferably from Hastelloy.

The reactor itself should—if not electrically heated—preferably be equipped with a heating jacket that permits coupling to a suitable heat transfer circuit (for example based on heat-transfer oil or superheated steam).

For the purposes of thorough contacting and easier detachment of the silicone from the HDPE/LDPE in the acidic reaction medium, the small pieces of cartridge material with adhering silicone are kept in motion through the use of an effective stirrer system.

If filler materials are present in the silicone sealant, these are likewise freed from HDPE/LDPE through detachment/dissolution of the silicone. At the end of the digestion according to the invention, the small-sized particles of HDPE/LDPE are removed from the liquid reactive siloxane interspersed with filler by filtration, for example with the aid of a coarse sieve; the latter can then be separated from the solid, finely particulate filler, for example by being left to settle.

In accordance with the invention and without narrowing the presented teaching, as advantageous embodiments it is of course also possible to find further solutions for the basic process operations discussed here, such as filtering off or centrifugally separating the filler from the reactive siloxane.

Traces of silicone can be eliminated from the small-sized particles of HDPE/LDPE through appropriate washing, for example by intimate contact with solvents, removal of the solvent and subsequent drying of the single-product polymer(s).

The term end-of-life silicones encompasses within the scope of the teaching of the invention all silicone-based or silicone-containing products and also products with adhering silicone or contaminated with silicone that are close to reaching and/or have already completely reached the end of their respective technical service life or shelf life or would be intended for disposal for another reason. The shelf life or service life describes here the time that a material or an article can be used without the replacement of core components or complete failure. The scope of the teaching also includes silicone adhesives and/or silicone sealants, for example in cartridges, that are close to reaching the end of their shelf life or their expiry date and/or have exceeded this (assessed according to the degree of hardening to be expected and/or which has already occurred), as well as e.g. varyingly old sprue and/or stamping waste from silicone rubber production or similarly also discarded electronic scrap containing silicone-sealed components/component groups. The term "end-of-life silicones" encompasses within the scope of the teaching of the invention in addition all silicone wastes, including production wastes. It encompasses in particular all silicones or silicone-containing components or components with adhering silicone or contaminated with silicone that would otherwise be intended for disposal in the usual manner and are accordingly regarded as waste. It thus encompasses for example also cartridges of silicone adhesive and/or silicone sealant intended for disposal, in particular used cartridges of silicone adhesive and/or silicone sealant in and on which silicone remnants are still adhering or present. The terms "silicone wastes" and "end-of-life silicones" can be understood as being for the purposes of the present invention synonymous.

The term "thermal digestion" means for the purposes of the present invention the process of transforming end-of-life silicones in the reaction medium of the invention into acidic, end-equilibrated siloxanes bearing acetoxy groups and having chain lengths of greater than 3 silicon atoms with an input of thermal energy, more particularly comprising appropriate heat-treatment of the end-of-life silicones at temperatures between 50° C. and 200° C.

Some prior art documents are concerned with the desiliconization of components occurring in the area of electronic parts or discarded electronic scrap (JP H04 318075 A and U.S. Pat. No. 6,652,665 B1) or even in polyamide or polyester synthetic fiber fabrics specifically for airbags (US 2010/0012623 A1 and EP 0950684 A2).

For instance, JP H04 318075 A teaches the detachment at room temperature of hardened silicone resins from hard, non-sensitive substrates, for example glass-epoxy supports and ceramic supports, with the aid of a mixture consisting of aliphatic hydrocarbons, chlorinated aliphatic hydrocarbons and monocyclic aromatics, acetone, methyl ethyl ketone, cyclohexanone, acetic acid/n-butyl acetate or a mixture consisting of the recited solvents or tetrahydrofuran with dodecylbenzenesulfonic acid, the solvent fraction being within a range from 40 to 90 percent by weight and the dodecylbenzenesulfonic acid fraction being within a range from 60 to 10 percent by weight.

The teaching of U.S. Pat. No. 6,652,665 B1 is aimed also at the removal of silicone deposits from electronic parts and uses as a wash solution for this purpose quaternary ammonium fluorides in a hydroxyl-free aprotic solvent.

Mignani in US 2010/0012623 A1 focuses on a delamination process for articles such as airbags, in which the silicone-coated substrate is separated from the silicone by dissolution or suspension in an aqueous solution of an alkali metal hydroxide or alkaline earth metal hydroxide in the presence of a phase transfer catalyst, optionally with additional heat treatment.

Likewise focusing on the utilization of the material of value polyamide specifically present in airbag wastes, EP 0950684 A2 is concerned with the processing of polyamide materials containing silicone resins through treatment of said materials with an alkali metal hydroxide while heating, removal of the solid material from the solution, and neutralization of solid material with phosphoric acid.

However, none of the mentioned desiliconization processes is concerned with the value-creating transformation of the silicone component being removed and, more particularly, with the provision of high-value Si products, particularly for the production of surface-active substances.

The process claimed according to the invention takes this situation into account and, besides the recovery of these silicone-bearing materials that are considered materials of value, also permits upcycling of the detached silicone to a Brønsted-acidic, end-equilibrated acetoxysiloxane that can ideally be employed as a reactive siloxane, for example in the production of polyether siloxanes.

The term "upcycling" thus denotes for the purposes of the present invention the transformation of silicone wastes into higher-value products, in other words an upgrade in material value; based on the definition in I. Vollmer et al., Angew. Chem. Int. Ed. 2020, 59, 15402-15423, the term "upcycling" thus preferably denotes for the purposes of the present invention the transformation of silicone waste into chemicals having higher market value as monomers or pyrolysis oil.

Since the digestion according to the invention takes place under moderate reaction conditions, any HDPE/LDPE that is for example recycled in tandem does not suffer any loss of quality.

According to the invention, the heat treatment of silicone wastes, for example silicone oils or silicone rubbers, is preferably executed at temperatures between 50° C. and 200° C., more preferably between 80° C. and 160° C., in particular between 120° C. and 150° C.

The digestion of the invention may advantageously be executed at standard pressure (1013 hPa), at reduced pressure, or else, in order to achieve high heat-treatment temperatures of up to 200° C., in pressure-resistant apparatuses under elevated pressure. The digestion of the invention is preferably carried out at standard pressure.

It is in accordance with the invention preferable when, in a preferred embodiment of the invention, the Brønsted acid having a pKa of <4 that is used is employed in amounts advantageously of 0.1 to 1.5 percent by mass, preferably in amounts of 0.15 to 1.0 percent by mass, more preferably in amounts of 0.2 to 0.8 percent by mass, based on the total proportion of silicone in the reaction system.

What is meant by "reaction system" is the entire substance mixture that is subjected to thermal digestion, i.e. comprising at least the end-of-life silicones to be utilized, acetic anhydride, acetic acid and at least one further Brønsted acid having a pKa of <4.

For ease of mixing, particularly in the digestion according to the invention of pieces of end-of-life silicone, it may be expedient to optionally add solvent to the reaction system. Solvents that are according to the invention suitable are firstly those that themselves promote mixing and contacting of the constituents of the digestion system in a chemically inert manner, for example alkanes and alkylaromatics such as toluene, xylene, etc. The drawback of using such chemically inert solvents is that it is as a rule necessary—no later than from the end-equilibrated acetoxysiloxane—to have to remove them again.

It is in addition optionally possible, this being particularly preferable in accordance with the invention, to also use chemically reactive, in particular silicon-containing, solvents in the form of liquid silicones and in particular silicones composed predominantly of D units, for example cyclosiloxanes such as decamethylcyclopentasiloxane and/ or also silicone oils. Since the amount employed of the optional chemically reactive, silicon-containing solvent is included in the silicone component of the total mass of the reaction system, this would need to be taken into account in the calculation for the respective batch. Advantageous in accordance with the invention is the optional use of such reactive silicon-containing solvents with a view to these solvents being chemically incorporated in the end-equilibrated acetoxysiloxane, thus rendering superfluous the need for their subsequent removal.

As regards the Brønsted acid having a pKa of <4 to be employed according to the invention, an embodiment of the invention that is particularly preferable is when the Brønsted acids used in the upcycling process are protic acids having a pKa of less than −1.30, such as preferably nitric acid, methanesulfonic acid and/or p-toluenesulfonic acid, preferably protic acids having a pKa of less than −2.90, such as preferably concentrated sulfuric acid, more preferably protic acids having a pKa of less than −4.90, such as preferably perfluoroalkanesulfonic acids such as heptafluoropropanesulfonic acid, pentafluoroethanesulfonic acid, trifluoromethanesulfonic acid, then perchloric acid and/or chlorosulfonic acid, particular preference being given to perfluoroalkanesulfonic acids, with trifluoromethanesulfonic acid most preferred here; also preferred are sulfonic acid or perfluoroalkyl sulfonic acid ion-exchange resins.

It is in accordance with the invention preferable when, in a preferred embodiment of the invention, acetic acid is added to the reaction system in amounts advantageously of 0.5 to 6.0 percent by mass, preferably of 1.5 to 3.5 percent by mass, based on the total proportion of silicone in the reaction system.

It is in accordance with the invention preferable when, in a preferred embodiment of the invention, acetic anhydride is employed in amounts of 0.13 to 33 percent by mass, preferably of 0.69 to 6.9 percent by mass, based on the total proportion of silicone in the reaction system.

What is meant by the proportion of silicone is for the purposes of the present invention the total mass of silicone in the reaction system.

It will be clear to those skilled in the art that, before processing unknown silicone wastes, it is advisable to take a representative sample and to carry out a test digestion on a laboratory and/or pilot-plant scale in order to determine how high the actual silicone content is and also what proportion of silicone-free components is to be expected. These include inter alia binders, plastics and, for example in the case of electronic scrap, metals, ceramics, etc.

According to the invention, the reaction is carried out in a reactor having a volume of at least 1 liter, but preferably at least 5 liters, in particular at least 10 liters and preferably not more than 500 000 liters.

The term "reactor" is well known to those skilled in the art and therefore needs no separate explanation. A reactor usually, and thus also preferably for the purposes of the present invention, refers to a defined space, for example a stirred container (e.g. a stirred-tank reactor) or a pipe (e.g. flow tube as a flow reactor), in which chemical transformations can be carried out in a selective manner. As is known to those skilled in the art, these may be open or closed containers in which the reactants are converted into the desired products or intermediates. The volume of reactors is stated by the manufacturer or may be determined by volumetric measurement. The reactor material may preferably be selected from materials suitable for this purpose, such as advantageously glass or ceramic, preferably from metal, more preferably highly alloyed stainless steels and particular preferably from Hastelloy. All this is known to those skilled in the art. Suitable reactors are preferably equipped with devices that enable mixing of the reaction mass. Suitable stirring technology or stirring systems are known to those skilled in the art and include e.g. propeller stirrers, anchor stirrers, paddle stirrers, inclined-blade stirrers, dissolvers, cup stirrers, jet mixers or magnetic stirrers. For heating or cooling of the reaction mass or for control of process heat in the interior of the reactor, it is possible to make use of known means, such as a jacket, half-pipe coils or full-pipe coils. As regards modes of operation, a distinction can essentially be made between a continuous and a discontinuous operating mode. In plants for large-scale production it is preferable to employ continuous processes, whereas for smaller amounts of product batchwise operation is preferable. All this is familiar to those skilled in the art. Reactors, such as stirred-tank reactors in particular are commercially available in a variety of ways, for example from Behilter KG Bremen GmbH & Co, Theodor-Barth-Str. 25, 28307 Bremen, Germany, or for example from Buchi AG, Gschwaderstrasse 12, 8610 Uster, Switzerland. Reference is also made to the German-language book "Chemiereaktoren: Grundlagen, Auslegung und Simulation" [Chemical reactors: Fundamentals, design and simulation], 19 Apr. 2017, by Jens Hagen; and also to the book "Handbuch Chemische Reaktoren, Grundlagen und Anwendungen der Chemischen Reaktionstechnik" [Handbook of chemical reactors, fundamentals and applications of chemical reaction engineering], edited by Wladimir Reschetilowski, publisher: Springer, Berlin; 1st edition 2020; and also to the book by Klaus Hertwig, Lothar Martens: "Chemische Verfahrenstechnik: Berechnung, Auslegung und Betrieb chemischer Reaktoren" [Chemical process engineering: Calculation, design and operation of chemical reactors], Oldenbourg, Munich 2007.

The present invention further provides for the use of acidic, end-equilibrated siloxanes bearing acetoxy groups and having chain lengths of greater than 3 silicon atoms produced from end-of-life silicones using an upcycling process, in particular as set out here in accordance with the invention, for the production of polyether siloxanes, in particular for the production of polyurethane foam stabilizers, defoamers, paint additives, levelling additives, dispersing additives and/or demulsifiers. Corresponding polyether siloxanes are obtainable by reaction of the acetoxysiloxanes with polyetherols.

The present invention further provides for the use of acidic, end-equilibrated siloxanes bearing acetoxy groups and having chain lengths of greater than 3 silicon atoms produced from end-of-life silicones using an upcycling process, in particular as described above, for the production of silicone-based adhesive compounds and/or sealant compounds.

Silicone-based adhesive compounds and/or sealant compounds are common knowledge and are widely used. Silicone sealant compounds account for by far the largest market share among elastic sealing compounds. The production of elastic silicone sealant compounds is normally based on a reactive polysiloxane, usually a reactive polydimethylsiloxane. The polymer is reactive, since it typically has a hydroxyl function at each end of the siloxane chain (PDM siloxane). In the traditional production of silicone sealant compounds, the reactive end groups of the polysiloxane are normally in a first step reacted with a crosslinking agent or crosslinker to form the so-called "prepolymer", which then cures on use through further crosslinking.

It is usually possible to use as the crosslinking agent an alkyltriacetoxysilane, preferably ethyltriacetoxysilane, whereby one of the three acetate functions thereof undergoes a condensation reaction with the terminal hydroxyl group of the PDM siloxane with the liberation of a molecule of acetic acid and the formation of a siloxane linkage. This results in the polydimethylsiloxane gaining two acetoxy functions at each terminus of the siloxane chain, in other words two reactive end groups at each end of the chain. It is these reactive groups, the purpose of which is to undergo reaction with moisture from the environment after the silicone paste has been applied, that result both in the formation of a new siloxane linkage between two polymer chains via condensation and the formation of a T-unit-crosslinked three-dimensional end structure via the two remaining reactive end groups by reaction with water or moisture from the environment. As well as this alkyltriacetoxysilane-based technology, alkoxy and oxime technologies are also known. Also found in the prior art, albeit to a much lesser degree, are benzamide, lactate and/or enoxy technologies.

In the context of the present invention it has now surprisingly been found that acetoxysiloxanes, and specifically in particular the acetoxysiloxanes produced according to the invention from end-of-life silicones using the upcycling process described herein, can be used particularly advantageously for the production of silicone-based adhesive compounds and/or sealant compounds and specifically preferably in that, in a departure from the usual procedure for the prepolymerization described above, proportions of the PDM siloxane are replaced by proportions of acetoxysiloxane, more preferably by proportions of acetoxysiloxane produced according to the invention, thereby affording adhesive and/or sealant compounds characterized by excellent curing kinetics and advantageously even by an improved modulus of elasticity compared with standard systems.

Without being bound to any particular theory, it is in the context of the present invention assumed that appropriate admixing of the acetoxysiloxane results in a formulation in which linear coupling of acetoxysiloxane units with hydroxy-functional siloxane initially produces longer siloxane chains that only then react with the crosslinking silane (for example ethyltriacetoxysilane) to form curable polymer ("prepolymer"). In other words, the introduction of the high acetoxy reactivity has for the purposes of the present invention already advantageously taken place in the prepolymer formation phase, resulting in longer siloxane chains that even have an improved modulus of elasticity, which would never form through the customary reaction of hydroxy-functional siloxane (PDM siloxane) with the acetoxysilane component, since the high tendency of the acetoxysilane component to undergo condensation would otherwise—with the rapid formation of three-dimensional network structures—prevent the generation of longer siloxane chains.

A prepolymer compound containing recycled acetoxysiloxanes that for the purposes of the present invention is particularly preferred can be used as an adhesive and/or sealant system e.g. directly as a polymerization-active compound or else preferably with the addition of additional formulation components.

During production of the silicone sealant compound and/or silicone adhesive compound, it is preferably possible to incorporate—usually for a number of reasons—additional additives such as plasticizers, extenders, fillers, pigments, dyes and/or adhesion promoters. To accelerate crosslinking in the end use, a catalyst may preferably also be added.

Linked to the objective of obtaining from the curable polymer a paste that is suitable for easy application as an end product, it is in a preferred embodiment of the invention possible to add at least one thickener, preferably silica ($SiO_2$), as a result of which the initially essentially liquid reaction product gives rise to a paste, in particular a stiff paste having viscoelastic rheology.

The resulting paste is then preferably used to fill suitable dispenser containers, usually plastic cartridges, from which the silicone sealant can be applied through a nozzle to the site of application by applying gentle pressure.

In a preferred embodiment of the invention, the acetoxysiloxane, more preferably the recycled acetoxysiloxane, is used in a substoichiometric amount based on the PDM siloxane, which means the molar amount of Si-attached acetoxy groups (≡SiOAc) is smaller than the molar amount of Si-attached hydroxy groups (≡SiOH).

The OH end group means that the polymer molecule remains reactive, thereby allowing the crosslinking agent to react with it. The purpose of the crosslinking agent is to provide more than one reactive and available end group after reacting with the end group on the reactive polymer.

The viscosity of the PDM siloxanes is expressed in pascal-seconds (Pa·s). It is therefore customary to characterize the reactive polymer products partly through their viscosity. Customarily used reactive polydimethylsiloxanes have a viscosity at 20° C. within a range from 20 to 350 Pa·s, for example those referred to as types 20 (20 Pa·s), 50 (50 Pa·s), 80 (80 Pa·s), 120 (120 Pa·s), 150 (150 Pa·s) and 350 (350 Pa·s). Suitable reactive polymers are available e.g. under the name Polymer FD from Wacker, Xiameter® OHX from Dow Corning or Silopren® E from Momentive Performance Materials or Bluesil® FLD from Bluestar or else under the name Polymer OH Series from Evonik.

In a further preferred embodiment of the invention, a triacetoxysilane, in particular ethyltriacetoxysilane, can be used with particular preference as crosslinking agent in the silicone sealant compound and/or silicone adhesive compound. These crosslinking agents referred to as being "acetic acid-containing" are known to result in more "viscoplastic" products, which are also characterized by a certain acidity. They are suitable for most end uses without problem, for example in glazing, sanitary uses, elastic bonding in the glass and metal industry or for gaskets in motor vehicles, boats or caravans. They are less suitable for alkaline substrates such as concrete or cemented substrates or for certain metals such as copper. Preference in the context of the invention is given to ethyltriacetoxysilane. The methyl, propyl and vinyl variants of the triacetoxysilane are however also known and suitable. The ethyl variant has the advantage of being liquid under standard conditions, which means it can be easily processed and incorporated into the composition. Mixtures of the methyl and ethyl variants are also in widespread use, since most versions thereof are liquid. Commonly used "acetic acid-containing" crosslinkers are methyltriacetoxysilane, ethyltriacetoxysilane, propyltriacetoxysilane and/or mixtures thereof.

Examples of suitable products are the crosslinkers ES21, ES23, ES24, available from Wacker, the crosslinkers 3034, 3187 from Momentive Performance Materials, the crosslinkers MTA, ETA, PTA, ETA/MTA (70/30), PTA/MTA (70/30) from Nitro Chemistry and the crosslinkers AC 10, 15, 30 from Evonik.

For the sealing of polyvinyl chloride (PVC) plastics, alkaline substrates and porous substrates, silicone sealant compounds having a more neutral composition as regards acid and acid generation may in the context of a preferred embodiment of the invention be preferable and thus by preference use crosslinking agents other than triacetoxysilanes.

In this preferred embodiment of the invention, it is accordingly possible to produce neutral silicone sealants, preferably with the use of one or more alkoxy-based silanes, preferably methyltrimethoxysilane or vinyltrimethoxysilane, or silanes having one or more oxime radicals as substituents on the silicon of the crosslinking agent. Benzamido or lactato radicals are also suitable. Among oxime-based crosslinking agents, methyl ethyl ketoxime, often abbreviated to MEKO, $CH_3—CH_2—(CH_3)C=N—OH$, is a known substituent. Other suitable substituents on the silicon atom of the silane crosslinking agent are acetone oxime, methyl isobutyl ketone oxime and/or methyl propyl ketone oxime.

Examples of suitable alkyltrialkoxy, alkenyltrialkoxy or phenyltrialkoxy crosslinkers are methyltrimethoxysilane, ethyltrimethoxysilane, propyltrimethoxysilane, vinyltrimethoxysilane, isobutyltrimethoxysilane, phenyltrimethoxysilane, methyltriethoxysilane, propyltriethoxysilane, methyltriethoxysilane, propyltriethoxysilane, methyltriethoxysilane, propyltriethoxysilane, methyltriethoxysilane, propyltriethoxysilane, vinyltriethoxysilane, phenyltriethoxysilane, octyltrimethoxysilane, octyltriethoxysilane and/or mixtures thereof.

Suitable products are e.g. Silquest® A-1630, Silquest® A-171, available from Momentive Performance Materials, Geniosil® XL-10, crosslinkers ME60, ME63, Geniosil GF56 from Wacker, crosslinker MTMS (Dynasylan®) VTMO (Evonik), vinyltrimethoxysilane, vinyltriethoxysilane from Nitrochemie.

In a further preferred embodiment of the invention, the acetoxysiloxane, more preferably the recycled acetoxysiloxane, is used in a preferably suprastoichiometric amount based on the PDM siloxane, which means the molar amount of Si-attached acetoxy groups (≡SiOAc) is greater than the molar amount of Si-attached hydroxy groups (≡SiOH).

The acetoxy end group then means that the polymer molecule is reactive, thereby allowing the crosslinking agent to react with it. The purpose of the crosslinking agent is to provide more than one reactive and available end group after reacting with the end group on the reactive polymer.

In this preferred embodiment of the invention, a triacetoxysilane, in particular ethyltriacetoxysilane, may be used with particular preference as crosslinking agent in the silicone sealant compound. These crosslinking agents referred to as being "acetic acid-containing" are known to result in more "viscoplastic" products, which are also characterized by a certain acidity. They are suitable for most end uses without problem, for example in glazing, sanitary uses, elastic bonding in the glass and metal industry or for gaskets in motor vehicles, boats or caravans. They are less suitable for alkaline substrates such as concrete or cemented substrates or for certain metals such as copper. Ethyltriacetoxysilane is preferred. The methyl, propyl and vinyl variants of the triacetoxysilane are however also known and suitable. The ethyl variant has the advantage of being liquid under standard conditions, which means it can be easily processed and incorporated into the composition. Mixtures of the methyl and ethyl variants are also in widespread use, since most versions thereof are liquid. Commonly used "acetic acid-containing" crosslinkers are methyltriacetoxysilane, ethyltriacetoxysilane, propyltriacetoxysilane and/or mixtures thereof.

Examples of suitable products are the crosslinkers ES21, ES23, ES24, available from Wacker, the crosslinkers 3034, 3187 from Momentive Performance Materials, the crosslinkers MTA, ETA, PTA, ETA/MTA (70/30), PTA/MTA (70/30) from Nitro Chemistry and the crosslinkers AC 10, 15, 30 from Evonik.

Given that the prepolymer is in this preferred embodiment of the invention intrinsically acidic, crosslinking is preferably still carried out with trialkoxysilane crosslinkers.

Examples of suitable alkyltrialkoxy, alkenyltrialkoxy or phenyltrialkoxy crosslinkers are methyltrimethoxysilane, ethyltrimethoxysilane, propyltrimethoxysilane, vinyltrimethoxysilane, isobutyltrimethoxysilane, phenyltrimethoxysilane, methyltriethoxysilane, propyltriethoxysilane, methyltriethoxysilane, propyltriethoxysilane, methyltriethoxysilane, propyltriethoxysilane, methyltriethoxysilane, propyltriethoxysilane, vinyltriethoxysilane, phenyltriethoxysilane, octyltrimethoxysilane, octyltriethoxysilane and/or mixtures thereof.

Suitable products are e.g. Silquest A-1630, Silquest A-171, available from Momentive Performance Materials, Geniosil® XL-10, crosslinkers ME60, ME63, Geniosil GF56 from Wacker, crosslinker MTMS (Dynasylan®) VTMO (Evonik), vinyltrimethoxysilane, vinyltriethoxysilane from Nitrochemie.

It corresponds to a preferred embodiment of the invention when, before it is used for production of silicone-based adhesive and/or sealant compounds, the acidic, end-equilibrated siloxane bearing acetoxy groups is freed of Brønsted acid originating from the upcycling process and still present therein.

This ensures better storage stability of the condensation-crosslinking polymer compound and also increases formulational flexibility as regards both the apportioning of quantities and the selection of a catalyst preferably still to be added. The Brønsted acid can be removed in a standard manner, preferably by neutralization with a base and subsequent removal of the resulting salt from the acetoxysilane. Regarding possible options for the removal in particular of the Brønsted acid, reference is also made to the teaching of European patent application EP 3744753 A1, which discloses a process for the purification of acetoxysilanes and is in this regard, corresponding to a further preferred embodiment of the invention, fully incorporated into the teaching presented herein.

The abovementioned embodiments make it clear that the acidic, end-equilibrated siloxanes bearing acetoxy groups and having chain lengths of greater than 3 silicon atoms obtainable according to the invention and produced using an upcycling process from end-of-life silicones as described above can be very readily and advantageously employed for the production of silicone-based adhesive and/or sealant compounds.

EXAMPLES

The examples that follow serve solely to elucidate this invention to those skilled in the art and do not constitute any restriction at all of the claimed process. The determination of water contents according to the invention is performed in principle by the Karl Fischer method based on DIN 51777, DGF E-III 10 and DGF C-III 13a. $^{29}$Si-NMR spectroscopy was used for reaction monitoring in all examples.

In the context of the present invention the $^{29}$Si NMR samples are analysed at a measurement frequency of 79.49 MHz in a Bruker Avance III spectrometer equipped with a 287430 probe head with slit width of 10 mm, at 22° C. in $CDCl_3$ solution, and against a tetramethylsilane (TMS) external standard [δ($^{29}$Si)=0.0 ppm].

The gas chromatograms are recorded on an Agilent Technologies GC 7890B GC instrument fitted with an HP-1 column having dimensions of 30 m×0.32 mm IDx0.25 µm dF (Agilent Technologies No. 19091Z-413E) using hydrogen as a carrier gas and employing the following parameters:
Detector: FID; 310° C.
Injector: Split; 290° C.
Mode: constant flow, 2 ml/min
Temperature program: 60° C. at 8° C./min-150° C. at 40° C./min-300° C. 10 min.

The point at which equilibrium has been reached is indicated by the total cycles content determined by gas chromatography, defined as the sum of the $D_4$, $D_5$ and $D_6$ contents based on the siloxane matrix and determined after derivatization to the corresponding α,ω-diisopropoxy-polydimethylsiloxanes of the α,ω-diacetoxypolydimethylsiloxanes obtained from the digestion according to the invention. Derivatization to the α,ω-diisopropoxypolydimethylsiloxanes chosen here with the express intention of preventing a thermally induced retrocleavage reaction of the α,ω-diacetoxypolydimethylsiloxanes that could take place under the conditions of the gas chromatography analysis (for information on the retrocleavage reaction, see inter alia J. Pola et al., Collect. Czech. Chem. Commun. 1974, 39(5), 1169-1176 and also W. Simmler, Houben-Weyl, Methods of Organic Chemistry, vol. VI/2, 4th edition, O-Metal Derivatives of Organic Hydroxy Compounds p. 162 ff)).

The employed polyether diols have water contents of about 0.2% by mass and are predried before use. Toluene and alkylbenzene (C10-C13) used have a water content of 0.03% by mass and are used without predrying.

The OH value of the polyether diols is determined according to DGF C-V 17 a (53) or according to Ph. Eur. 2.5.3 Method A, wherein the hydroxyl groups of the sample to be analysed are firstly acetylated with acetic anhydride in the presence of pyridine, followed by a differential titration (blank sample, taking into account the excess acetic anhydride) in which the liberated acetic acid is titrated as consumption of KOH in mg per gram of polyether diol.

Example 1 (Inventive)

Production of an End-Equilibrated, Acetoxy-Terminated, Linear Polydimethylsiloxane A 1000 ml four-necked flask with precision glass stirrer, internal thermometer and fitted reflux condenser is charged, while stirring, with 120.0 g of a transparent, hardened silicone compound (Care SanitAr Profisilikon, from Conel GmbH) cut into pieces of approx. 4 to 6 mm edge length together with 50.0 g (0.489 mol) of acetic anhydride and 280.0 g (0.752 mol) of decamethylcyclopentasiloxane ($D_5$) and also 13.6 g of acetic acid (3.0 percent by weight based on the total mass of the reactants), mixed with 0.92 g (0.54 ml) of trifluoromethanesulfonic acid (0.2 percent by mass based on the total mixture), and quickly heated to 80° C. The reaction mixture, which is initially interspersed with proportions of visibly coarser solid material, is held at this temperature for 6 hours with continued stirring.

On cooling the mixture, a colorless, clear, freely mobile liquid separates as the supernatant of a deposited white solid that is removed by filtration through a filter press. The $^{29}$Si NMR spectrum of the clear colorless filtrate shows the presence of Si-acetoxy groups in a yield of approx. 94% based on acetic anhydride used, corresponding to an α,ω-diacetoxypolydimethylsiloxane having an average total chain length of about 14.

Conversion of the α,ω-Diacetoxypolydimethylsiloxane into the Corresponding α,ω-Diisopropoxypolydimethylsiloxane for Analytical Characterization Immediately after the synthesis, 50.0 g of this trifluoromethanesulfonic acid-acidified, equilibrated α,ω-diacetoxypolydimethylsiloxane in a 250 ml four-necked round-bottomed flask equipped with a precision glass stirrer, an internal thermometer and fitted reflux condenser is mixed at 22° C., with stirring, with 11.3 g of isopropanol dried over molecular sieves. The reaction mixture is then charged with gaseous ammonia ($NH_3$), which is passed in until alkaline (moist universal indicator paper), and then stirred at this temperature for a further 45 minutes. The precipitated salts are removed using a fluted filter.

A colorless, clear liquid is isolated, the $^{29}$Si NMR spectrum of which demonstrates quantitative conversion of the α,ω-diacetoxypolydimethylsiloxane into an α,ω-diisopropoxypolydimethylsiloxane.

An aliquot of this α,ω-diisopropoxypolydimethylsiloxane is withdrawn and analysed by gas chromatography. The gas chromatogram shows the following contents (stated in percent by mass):

| $D_4$ | $D_5$ | $D_6$ | Total ($D_4$-$D_6$) | Isopropanol content |
|---|---|---|---|---|
| 2.90% | 2.20% | 0.70% | 5.80% | 1.50% |

After taking into account the isopropanol excess, the contents of cyclosiloxanes ($D_4$, $D_5$ and $D_6$) are calculated here solely based on the siloxane fraction.

Example 2 (Inventive)

Conversion of the α,ω-diacetoxypolydimethylsiloxane obtained in example 1 into an SiOC-linked, linear polydimethylsiloxane-polyoxyalkylene block copolymer of the ABA structural type in toluene with ammonia as auxiliary base.

A 500 ml four-necked flask with precision glass stirrer, internal thermometer and fitted reflux condenser is charged, while stirring, with 96.0 g of a butanol-started, polypropylenoxy-group-containing polyetherol having an average molar mass of 1935 g/mol (determined according to the OH value) together with 126 ml of toluene. To this is then added 30.0 g of the α,ω-diacetoxypolydimethylsiloxane produced in example 1. Stirring of the reaction matrix is continued and a moderate stream of gaseous ammonia is passed into it via a gas-inlet tube for a period of 45 minutes until a drop on moist universal indicator paper shows it to be clearly alkaline.

Passage of a reduced flow of ammonia is continued for a further 45 minutes and the reaction mixture is heated to 50° C. Gas introduction is terminated and the mixture is allowed to cool to 23° C., after which the salts present therein are separated from the liquid using a fluted filter. The clear filtrate thus obtained is freed from volatiles on a rotary evaporator at a bath temperature of 70° C. and an applied vacuum of <1 mbar.

A colorless, clear ABA-structured polydimethylsiloxane-polyoxyalkylene block copolymer is isolated, the $^{29}$Si NMR spectrum of which confirms the target structure.

The invention claimed is:
1. An upcycling process for producing acidic, end-equilibrated siloxanes bearing acetoxy groups and having chain lengths of greater than 3 silicon atoms from end-of-life silicones by thermal digestion of the end-of-life silicones in an acidic reaction medium comprising acetic anhydride, acetic acid and at least one further Brønsted acid having a pKa of <4, the digestion taking place in a reactor having a volume of at least 1 liter.

2. The upcycling process according to claim 1, wherein the digestion is carried out without removal of water.

3. The upcycling process according to claim 1, wherein the digestion takes place in a reactor having a volume of at least 5 liters.

4. The upcycling process according to claim 1, wherein the digestion is executed at temperatures between 50° C. and 200° C.

5. The upcycling process according claim 1, wherein the Brønsted acid having a pKa of <4 is used in amounts of 0.1 to 1.5 percent by mass based on the total proportion of silicone in the reaction system.

6. The upcycling process according to claim 1, wherein the acetic acid is used in amounts of 0.5 to 6.0 percent by mass based on the total proportion of silicone in the reaction system.

7. The upcycling process according to claim 1, wherein the acetic anhydride is used in amounts of 0.13 to 33 percent by mass based on the total proportion of silicone in the reaction system.

8. The upcycling process according to claim 1, wherein the Brønsted acids used are protic acids having a pKa of less than −1.30.

9. The upcycling process according to claim 1, wherein the thermal digestion is carried out at standard pressure (1013 hPa), elevated pressure or reduced pressure.

10. The upcycling process according to claim 1, wherein the end-of-life silicones comprise silicone adhesives and/or silicone sealants.

11. The upcycling process according to claim 1 in which silicone-contaminated polyethylene is recycled to provide acidic, end-equilibrated siloxanes bearing acetoxy groups and having chain lengths of greater than 3 silicon atoms with the essentially single-product recovery of polyethylene.

12. The upcycling process according to claim 1, wherein the end-of-life silicones are selected from the group consisting of silicone adhesives, silicone sealants, silicone rubber wastes, and silicone oil wastes.

13. The upcycling process according to claim 1, wherein the digestion takes place in a reactor having a volume of at least 10 liters and not more than 500 000 liters.

14. The upcycling process according to claim 1, wherein the digestion is executed at temperatures between 80° C. and 160° C.

15. The upcycling process according to claim 1, wherein the Brønsted acid having a pKa of <4 is used in amounts of 0.2 to 0.8 percent by mass, based on the total proportion of silicone in the reaction system.

16. The upcycling process according to claim 1, wherein the acetic acid is used in amounts of 1.5 to 3.5 percent by mass, based on the total proportion of silicone in the reaction system.

17. The upcycling process according to claim 1, wherein the acetic anhydride is used in amounts of 0.69 to 6.9 percent by mass, based on the total proportion of silicone in the reaction system.

18. A method of preparing an SiOC-linked polyether siloxane, comprising producing an acidic end-equilibrated siloxane bearing acetoxy groups by the upcycling process of claim 1; and reacting said acidic end-equilibrated siloxane bearing acetoxy groups with a polyether.

\* \* \* \* \*

UNITED STATES PATENT AND TRADEMARK OFFICE
CERTIFICATE OF CORRECTION

PATENT NO. : 11,732,092 B2
APPLICATION NO. : 17/476417
DATED : August 22, 2023
INVENTOR(S) : Wilfried Knott, Horst Dudzik and Dietmar Schaefer Page 1 of 1

It is certified that error appears in the above-identified patent and that said Letters Patent is hereby corrected as shown below:

On the Title Page

Column 1, Item (30), Line 2 FOREIGN APPLICATION PRIORITY DATA currently reads:
"2117443"
And should read:
--21174438--; and Page 2, Column 2, Item (56), Line 6 OTHER PUBLICATIONS currently reads:
"Produce Sichlorodimethylsilane,"
And should read:
--Produce Dichlorodimethylsilane,--.

Signed and Sealed this
Thirtieth Day of January, 2024

Katherine Kelly Vidal
*Director of the United States Patent and Trademark Office*